Oct. 17, 1933.          R. F. SCHUCHARDT          1,931,013
RELAY SYSTEM
Filed Dec. 6, 1928
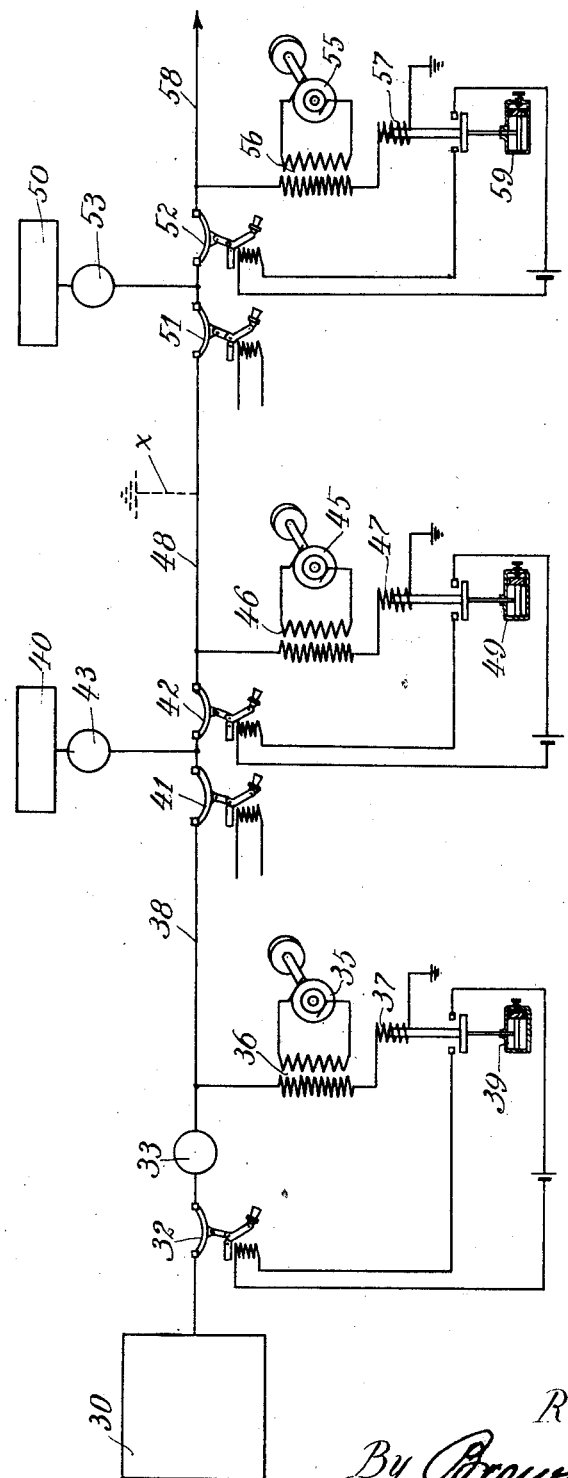
Inventor
Rudolph F. Schuchardt
By Brown Jackson Bauer &
Dinner Atty's Patented Oct. 17, 1933

1,931,013

UNITED STATES PATENT OFFICE 1,931,013

RELAY SYSTEM

Rudolph F. Schuchardt, Chicago, Ill.; Northern Trust Company, Chicago, Ill., a corporation of Illinois executor of said Rudolph F. Schuchardt, deceased Application December 6, 1928. Serial No. 324,183

14 Claims. (Cl. 175—294)

This invention relates to protective means for protecting electric systems against ground faults, and in general it is an object of this invention to provide a protective arrangement whereby any current carrying line whether in a power system or in a communicating system may be readily and automatically disconnected from the system upon the occurrence of a ground fault on the line. The protective system is such as not to require the use of conductors paralleling the circuit being protected, thus rendering it particularly applicable to long transmission lines.

In the embodiments of my invention here illustrated I protect an alternating current system against ground faults occurring on a particular portion of the system by connecting to that portion a relay and a grounded source of alternating current of a frequency different from the frequency of the circuit, the relay being arranged to operate only responsive to the flow of current from said source of current to a ground fault, and upon operating to cause the tripping of a circuit breaker to isolate that portion of the system.

In order to confine the alternating current of the connected source to the particular portion of the circuit considered that portion is provided with one or more gates connecting it with the rest of the circuit, the gates being such as to permit the free passage of current of the frequency of the system while preventing the flow of current of the frequency of the connected sources. Either a power condenser or an inductance may constitute the gate, the choice depending on the electrical characteristics of the transmission system. When a condenser is used the frequency of the connected source of current is less than the frequency of the system and where an inductance is used the frequency is greater than the frequency of the system. The frequency of the connected source of current is preferably so widely different from the frequency of the system that practically no current of that frequency can flow through the gate. By this arrangement a small source of control current may be used. The operation of the protective system is also independent of the load on the system being protected.

The attainment of the objects of this invention will be apparent from the following specification taken in conjunction with the accompanying drawing forming a part thereof.

The single figure of drawing illustrates in diagrammatic form, a simple power circuit to which my invention is applied.

I have shown my protective system applied to a power transmission circuit. The generating station 30 transmits power through the gate 33 to the line comprising sections 38, 48, 58, etc., by way of the switches 32; 41, 42; 51, 52; etc. The substations 40, 50, etc., are connected to the transmission line through the gates 43, 53, etc. The gates 33, 43, 53, may be either inductances or capacitors, as previously pointed out. The switches 41 and 51 are switches usually employed in such circuits and with which my invention is not concerned. The switches 32, 42, 52, etc., are a portion of the apparatus introduced into the system in order to protect it against ground faults. At each section of the line there is provided a constantly driven motor generator set 35, 45, 55, for furnishing alternating current to the protecting relays 37, 47, 57. These generators are each connected to the respective line sections through the transformers 36, 46, 56, the secondaries of which connect the respective relays to the respective line sections. In order to avoid the necessity of synchronizing the generators 35, 45, 55, they are preferably of widely different frequencies and of a frequency a good deal below the frequency of the line where capacitor gates are used, and above the frequency of the line where inductive gates are used.

When the system is in normal operation, there is practically no current of the frequency necessary to operate relay flowing through the secondaries of the transformers 36, 46, 56, since the gates 33, 43, 53, block the flow of current of the frequency of the generators 35, etc., from flowing either to the main station or to the substations.

Upon the occurrence of a ground fault at any point X on the line, a circuit will be completed from each of the grounded relays 37, 47, 57, through the secondaries of the respective transformers to the grounded fault. Each of the relays commence to operate. The relays are each provided with dash pots 39, 49, 59, so adjusted with respect to one another that the relay 57 which is furthest from the generating station 30 operates first, the relay 47, next and relay 57 last. The relay 57 upon operating closes the circuit for the tripping coil of the switch 52, which trips instantly and disconnects the section 58 from the generating station 30.

At this time the relay 47 has not yet fully operated. A moment later the relay 47 closes the circuit for the tripping coil of the switch 42 which instantly opens the switch and disconnects the section 48 from the generating station. At this time the relay 37 has not yet fully opperated. Upon the opening of the switch 42 the circuit for the relay 37 to the grounded fault X is opened, and the relay falls back without having closed its contacts. As a result, the substation 40 continues to receive power from the generating station 30, while all the substations beyond 40 are disconnected from the generating station 30.

Had the grounded fault occurred upon the section 58, instead of 48, it is apparent that upon the tripping of the switch 52 the circuit for the relay 47 as well as the circuit for the relay 37 would be opened and both of those relays would fall back without having closed their front contacts. In this case the substations 40 and 50 would remain connected to the source of power 30 while the substations beyond 50 would be disconnected.

In compliance with the requirements of the patent statutes, I have herein shown and described a few preferred embodiments of my invention. My invention is, however, not limited to the embodiments shown, those embodiments being merely illustrative of invention. What I consider new and desire to secure by Letters Patent is:

1. An electric system comprising a line made up of a number of series connected sections, switching means connecting the sections, a source of power connected to one end of the line, power utilizing means connected to said line at spaced points on the line, means for connecting to the line a source of control current of different characteristics from the line current, blocking means for blocking the flow of current from said control source to the source of power and to the power utilizing means, and means controlled by control current upon the occurrence of a fault on the line to operate the switching means between the sections in sequence to sequentially disconnect the sections, the action of said last named means depending upon current flowing to said fault whereby the disconnect switching operation ceases upon the disconnection of the faulty section.

2. In an alternating current circuit, a source of alternating current, a line comprising a number of series connected links connected to said source, a plurality of sources of control current one at each link, the respective sources of control current being connected to the respective links to supply current thereto, switching means at each link controlled from the respective sources of control current to disconnect the respective links from the line, said switching means being simultaneously energized from said sources of control current and sequentially operated in the order of their distances from a predetermined point on the line.

3. In an alternating current system, a source of alternating current, a line comprising a number of series connected links connected to said source, a plurality of sources of control current of different frequencies, one at each link, said frequencies being different from the line frequency, switching means at each link for disconnecting the link from the line, said switching means being controlled by current from the respective sources of control current flowing through any of said links.

4. In an alternating current system, means for protecting a circuit against ground faults supplied with current flowing over a particular portion thereof, said means comprising a number of grounded sources of controlling alternating potential of different frequencies and different from the frequency of the circuit, connected to the circuit at a plurality of spaced points on the particular portion dividing said portion into a number of sections, blocking means for preventing the flow of current from said sources away from the particular portion of the circuit to the rest of the circuit while permitting flow of the controlling current through the various sections of the portion of the line, and means at each of said points responsive to the flow of current from the grounded sources of potential for disconnecting the particular section from the rest of the circuit.

5. An alternating current electric system comprising a line made up of a number of series connected sections, switching means connecting the sections, a source of power connected to one end of the line, power utilizing means connected to said line at the junctures of said sections, and means for operating the switching means upon the occurrence of a ground fault on any of said sections of the line, said last means comprising, at each section, a grounded source of current of different frequency from the frequency of the line current and a marginal relay connected in series relation with one another and connected to the line; means for confining the current from said sources to the line but permitting the flow of current from said sources through the various sections of the line, said relays being unresponsive to the current from the line that normally flows therethrough and responsive to the additional current flowing therethrough from said sources upon the occurrence of a ground fault, and contacts controlled by the respective relays for controlling the respective switching means.

6. In combination, a power line connected to a source of power comprising a plurality of series connected sections, switching means for connecting and disconnecting the respective sections, control means associated with each of the switching means, certain of said control means including a source of current of characteristics different from the characteristics of the power current of the line, said sources of current being connected to the line and adapted, upon the occurrence of a fault on the line, to supply current over the line and thereby actuate the control means, the speed of action of said control means at the successive sections being timed for successive operation.

7. In combination, a power line connected to a source of power comprising a plurality of series connected sections, switching means for connecting and disconnecting the respective sections, control means associated with each of the switching means, certain of said control means including a source of current of characteristics different from the characteristics of the power current of the line, said sources of current being connected to the line and adapted, upon the occurrence of a fault on the line, to supply current over the line and thereby actuate the control means, the speed of action of said control means at the successive sections being timed, the control means closest to the power source being slowest in action and those further from the power source being successively faster in action.

8. An electric system comprising a line made up of a number of series connected sections, switching means connecting the sections, a source of power connected to one end of the line, power utilizing means connected to said line at spaced points on the line, means for connecting to the line a source of control current of different frequency from the line frequency, blocking means for blocking the flow of current from said control source to the source of power and to the power utilizing means, and means controlled by control current upon the occurrence of a fault on the line to operate the switching means between the sections in sequence to sequentially disconnect the sections, the action of said last named means depending upon current flowing to said fault whereby the disconnect switching operation ceases upon the disconnection of the faulty section.

9. In an alternating current circuit, a source of alternating current, a line comprising a number of series connected links connected to said source, a plurality of sources of control current of frequencies different from the line frequency one at each link, the respective sources of control current being connected to the respective links to supply current thereto, switching means at each link controlled from the respective sources of control current to disconnect the respective links from the line, said switching means being simultaneously energized from said sources of control current and sequentially operated in the order of their distances from a predetermined point on the line.

10. In combination, a power line connected to a power source and comprising a plurality of series connected sections, switching means for connecting and disconnecting the respective sections, control means associated with each of the switching means, certain of said control means including a source of current of a frequency different from the frequency of the power current of the line, said sources of current being connected to the line and adapted, upon the occurrence of a fault on the line, to supply current over the line and thereby actuate the control means, the speed of action of said control means at the successive sections being timed for successive operation.

11. In combination, a power line connected to a power source and comprising a plurality of series connected sections, switching means for connecting and disconnecting the respective sections, control means associated with each of the switching means, certain of said control means including a source of current of a frequency different from the frequency of the power current of the line, said sources of current being connected to the line and adapted, upon the occurrence of a fault on the line, to supply current over the line and thereby actuate the control means, the speed of action of said control means at the successive sections being timed, the control means closest to the power source being slowest in action and those further from the power source being successively faster in action.

12. In combination with an alternating current line provided with circuit breakers along its length for interrupting the continuity of the line and breaking the same into sections, separate ground protecting means associated with the respective circuit breakers each to trip the associated circuit breaker responsive to the completion of a circuit to a ground fault on the line, said protecting means being timed with respect to one another to be effective in a predetermined sequence and being dependent upon the continuation of the ground for their respective time intervals whereby the disconnection of the grounded section will prevent the further disconnection of the sections timed for subsequent disconnection, all of said protecting means being normally responsive to a fault on any of the sections whereby a failure of one of the protecting means will permit of disconnection by the subsequently timed protecting means.

13. In combination with an alternating current line provided with circuit breakers along its length for interrupting the continuity of the line and breaking the same into sections, separate ground protecting means associated with the respective circuit breakers each to trip the associated circuit breaker responsive to the completion of a circuit to a ground fault on the line, said protecting means being timed with respect to one another to be effective in a predetermined sequence and being dependent upon the continuation of the ground for their respective time intervals whereby the disconnection of the grounded section will prevent the further disconnection of the sections timed for subsequent disconnection, all of said protecting means being normally responsive to a fault on any of the sections whereby a failure of one of the protecting means will permit of disconnection by the subsequently timed protecting means, the respective protecting means including controlling sources of alternating current of respectively different frequencies connected to the line.

14. An electric system comprising a line made up of a number of series connected sections, switching means connecting the sections, a source of power connected to one end of the line, power utilizing means connected to said line at spaced points thereon, means for connecting to the line a source of control current of characteristics different from the line current, blocking means for blocking the flow of current from said control source to the source of power and to the power utilizing means, and means controlled by the control current upon the occurrence of a fault on the line to operate the switching means between the sections in sequence to sequentially disconnect the switch sections, the action of said last named means depending upon current flowing to said fault from said sources of control current, whereby the disconnect switching operation ceases upon the disconnection of the faulty section.

RUDOLPH F. SCHUCHARDT.